United States Patent
Streb

[15] 3,650,501
[45] Mar. 21, 1972

[54] APPARATUS FOR CRADLING TANKS

[72] Inventor: Ernest L. Streb, Raymondville, Tex.

[73] Assignee: Frontier Industries, Inc., Raymondville, Tex.

[22] Filed: June 15, 1970

[21] Appl. No.: 46,187

[52] U.S. Cl. .................................248/146, 264/45, 280/5 R
[51] Int. Cl. .......................................................B65d 25/24
[58] Field of Search......................248/129, 146, 154, 14, 19,
248/20; 264/45; 280/5 C, 5 D, 5 R, 5 E; 220/18;
114/74 T

[56] References Cited

UNITED STATES PATENTS 2,870,982  1/1959  Greene et al. ..........................248/146
3,163,435  12/1964  Krueger et al. ......................264/45 X

*Primary Examiner*—J. Franklin Foss
*Attorney*—Schmidt, Johnson, Hovey & Williams

[57] ABSTRACT

A method and apparatus for cradling a tank wherein the latter is constantly held in cushioned, spaced relationship with U-shaped framework of the cradle. The tank is cradled by filling the space between the tank and the framework with an initially fluid, resinous substance which bonds with the framework and the tank as the substance cures to a solid, resilient state. Upon curing, the tank and cradle are integrally bonded into a single composite unit wherein the resinous substance cushions the tank away from the framework to distribute the load evenly over the surface of the tank. A protective, fiber glass sheath enclosing the cradle is bonded to the tank.

8 Claims, 7 Drawing Figures

Patented March 21, 1972 3,650,501
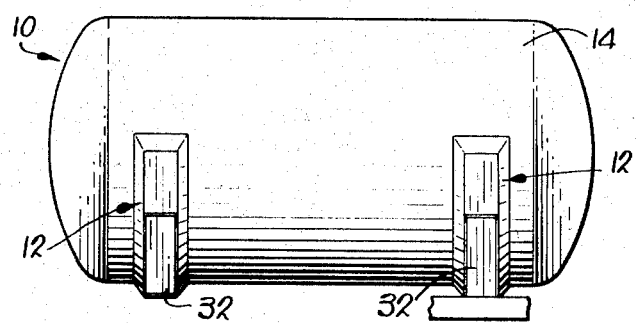
Fig.2.
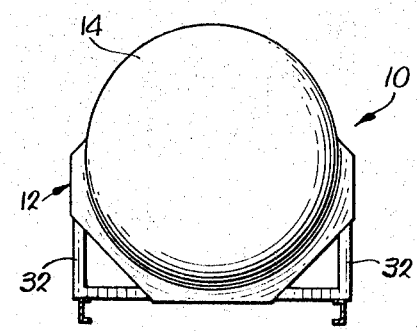
Fig.1.
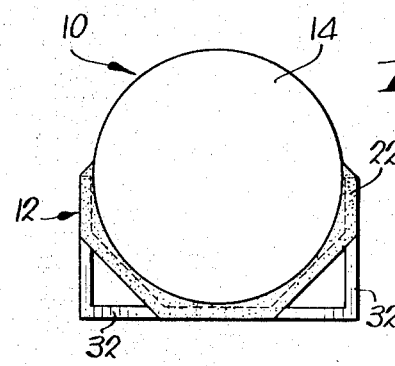
Fig.4.
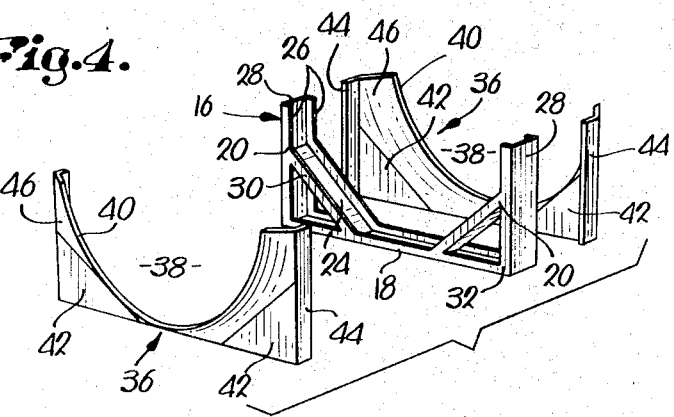
Fig.3.
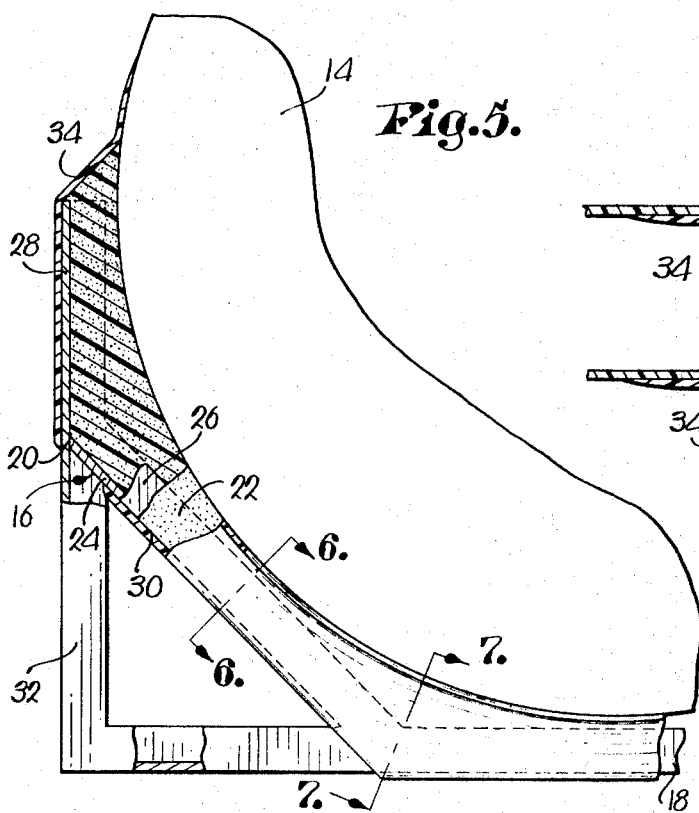
Fig.5.
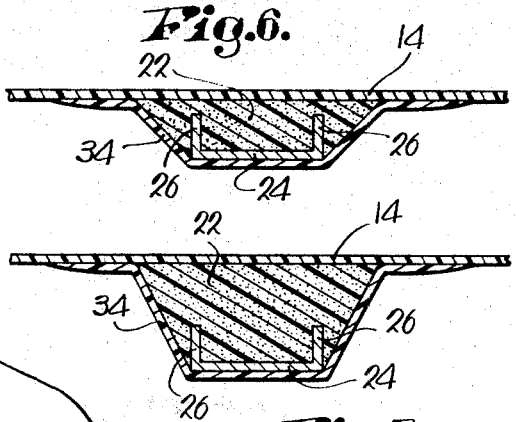
Fig.6.
Fig.7.
INVENTOR.
Ernest L. Streb
BY
Schmidt, Johnson, Hovey,
Williams & Chase
ATTORNEYS.

APPARATUS FOR CRADLING TANKS

This invention relates to a method and apparatus for supporting structures in such a manner as to evenly distribute the load to avoid points of stress concentration. More particularly, this invention is especially suited for gently cradling portable storage tanks to eliminate structural fatigue in the tank walls during use.

Modern farming practices often include the application of ammonia or other fertilizer solutions to growing crops. In addition, weeds and other undesirable plants often require eradication through the application of an appropriate herbicide solution. Such applications are most conveniently carried out through the use of portable spraying equipment wherein the solution to be applied is contained in a storage tank carried by a trailer which is towed behind a tractor or similar vehicle.

A problem associated with this manner of application lies in mounting and supporting tanks of this type on the trailer. Sprayer tanks are generally cylindrical or spherical in configuration because of the inherent wall strength which an article of this shape displays. However, because of the arcuate outer surface of such tanks, difficulties have been encountered in mounting the tanks in a suitable manner.

Methods heretofore used have included a shallow saddle arrangement having a concave upper face for receiving the bottom arcuate stretch of a tank, there being holddown straps which are looped around the tank and are adjustably bolted at their opposed ends to the saddle. This manner of supporting and holding the tank is unsatisfactory because the tank is supported underneath at only a few points, this being especially true if any surface irregularities are present in the tank wall. This results in stress concentration causing fatigue with the result that the tank develops cracks and holes permitting leakage. Further, the straps often work loose as the trailer encounters uneven terrain in the field, thereby causing the tank to shift and vibrate or bounce against the saddle which results in increased wear and fatigue.

Accordingly, it is an important object of the present invention to eliminate the above-mentioned problems by providing a method and apparatus for supporting structure such as fluid supply tanks wherein such a tank is firmly yet gently cushioned in constant spaced relationship from underlying framework, whether the tank is designed for stationary use, over-the-road transportation or mobile field work. In furtherance of this object an important aim is to provide as a single composite unit, a cradle tank structure wherein the cradle includes an initially fluid cushioning substance interposed between the tank and the framework which bonds with the latter and the tank as it cures to form the cushioned composite unit.

As a corollary to the above object, an important goal of this invention is to eliminate the need for servicing the tank structure on the road, in the field or otherwise, to tighten holddown straps or the like, such servicing being eliminated by means of the integral, unitary construction of the cradle and tank.

A further object of the present invention is to provide a tank unit which is capable of accomplishing the above objects, with the additional benefit of being extremely sturdy and virtually indestructible in use.

In the drawing:

FIG. 1 is an end elevational view of a tank and cradle unit made pursuant to and capable of carrying out the method of the present invention;

FIG. 2 is a front elevational view of the unit of FIG. 1;

FIG. 3 is an exploded, perspective view illustrating the relationship between the cradle framework and the molds used during application of the fluid cushioning substance;

FIG. 4 is an end elevational view similar to FIG. 1 and illustrating the relationship between the cured cushion and the tank;

FIG. 5 is an enlarged, fragmentary, end elevational view of the unit, parts thereof being broken away and shown in cross section to reveal details of construction;

FIG. 6 is a fragmentary, cross-sectional view taken along line 6—6 of FIG. 5 illustrating the spaced relationship between the cradle framework and the tank wall; and FIG. 7 is a cross-sectional view taken along line 7—7 of FIG. 5.

The unit 10 broadly includes a pair of cradles 12 and structure to be supported in the nature of a tank 14 integral with the cradles 12. The cradles 12 are identical in construction and any number thereof may be utilized in support of the tank 14; therefore, only one of the cradles will be hereinafter described in detail. Each of the cradles 12 includes a generally U-shaped frame 16 looped beneath tank 14 presenting a bight 18 underlying the tank, and a pair of opposed legs 20 extending upwardly from bight 18 having tank 14 disposed therebetween. Cradle 12 further includes a cushion 22 interposed between all areas of frame 16 and tank 14 and bonded to both the outer face of the latter and the inner face of frame 16.

The frame 16 is constructed from metal channels or the like which serve as a container for cushion 22, such container having a bottom wall 24 looped beneath cushion 22 and in bonded engagement therewith, and a pair of spaced flanges 26 on opposite sides of bottom wall 24 extending laterally therefrom toward tank 14 and embedded within cushion 22. As may be seen most clearly in FIGS. 6 and 7, cushion 22 is generally trapezoidal in transverse cross section and extends outwardly from the container presented by frame 16, and laterally in opposite directions toward tank 14.

Each leg 20 of frame 16 includes an upright portion 28 and an inclined portion 30 extending downwardly and inwardly therefrom to bight 18. In order to mount frame 16 on a suitable support such as the bed of a trailer or the like, mounting means in the nature of a pair of opposed L-shaped elements 32 are connected with frame 16 at bight 18 and with the proximal legs 20 at the corresponding upper portions 28. For ease of manufacture, the elements 32 have been shown in the drawing as integral parts of the channel members which are used as the legs 20 of frame 16, although manifestly, such manner of construction need not be universally followed. In any case, the channel configuration of elements 32 lend structural strength to frame 16, although elements 32 do not serve as a container for cushion 22 as will hereinafter become clear.

Any surface irregularities in tank 14 are absorbed by the cushion 22 which is provided with an upper surface conforming precisely with the shape of the proximal outer face of the tank, the lower surface of cushion 22 conforming in shape with that of the proximal inner face of frame 16. Because of the resulting spaced relationship between such surface irregularities and frame 16, line or point contact between tank 14 and metal surfaces of frame 16 is avoided, eliminating any points of stress concentration and reducing tank fatigue. A protective fiber glass sheath 34 applied to the exterior of cradle 12, encloses the latter and is bonded to the outer surface of tank 14. As shown in FIGS. 6 and 7, the sheath 34 approaches the tank surface at an angle in accordance with the trapezoidal cross-sectional configuration of cushion 22 thereby permitting sheath 34 to flex to a certain extent as cushion 22 is compressed by tank 14 to absorb shocks and bumps.

Construction of the unit 10 in a manner to provide for proper support of tank 14 is a relatively simple process. If a pair of cradles are to be utilized as in FIG. 2, initially a pair of the frames 16 should be placed in proper spaced relationship. This is most easily accomplished by securing the frames 16 to suitable fixtures on a flat surface such as a factory floor; thereafter a pair of end molds 36 may be clamped onto opposite sides of each frame 16 as in the relationship illustrated in FIG. 3.

The molds 36 may be constructed from molded fiber glass or any other suitable material and serve two purposes. First, the molds 36 have a semicircular open area 38 for receiving tank 14 after the molds 36 has been clamped in place. Arcuate edges 40 on molds 36 define the lower extremities of areas 38 and, when molds 36 are properly positioned, edges 40 extend upwardly and inwardly beyond flanges 26 on frame 16 to thereby support tank 14 in spaced relationship to any metal surfaces or edges.

Secondly, the molds 36 serve to define the shape of cushion 22 when the latter is formed as hereinafter described. In this regard, each of the molds 36 has a pair of triangular, flat sections 42 which lie flush with the sides of elements 32, a pair of opposed, flat, upright strips 44 designed to lie against the outer face of portion 28 and element 32, and a somewhat irregularly curved zone 46 extending outwardly from sections 42 and strips 44, terminating in the arcuate upper edges 40. In this manner the cushion 22 assumes the trapezoidal configuration of FIGS. 6 and 7, while leaving the area between elements 32 and inclined portions 30 free of such material.

The cushion 22 comprises a suitable resilient foam material such as polyurethane or the like which has cured from an initially fluid resinous state after combination with an appropriate catalyst. Therefore, as a further step in the production of the unit 10, with the tank 14 supported by mold edges 40 in spaced relationship with the frame 16, the resin and catalyst should be directed into the space between tank 14 and frame 16 at one end of the latter for flow to the opposite end of the frame until such space is completely filled. It may be seen that the channel configuration of the frame components aids in directing the flow of the resin beneath tank 14, while the molds 36 limit the extent of flow of the resin laterally in opposite directions from the channel.

As the resinous substance foams, the shape of the proximal outer face of tank 14 is closely adhered to and surface irregularities therein become absorbed into the upper face of the substance. As the substance cures, it bonds tightly with both the outer face of tank 14 and the inner face of frame 16 whereby, upon solidification of the substance, tank 14 and frame 16 are integrally bonded to form the desired composite unit 10.

Upon the removal of molds 36 the cured resinous substance serves as the cushion 22 to support the tank 14 in spaced relationship with all portions of frame 16. Thereafter, the protective fiber glass sheath 34 may be added to the exterior of cradle 12 and bonded to the outer face of tank 14 assuming the transverse configurations shown in FIGS. 6 and 7. The sheath 34 may be applied by any suitable conventional method, such as by spraying a mixture of a shitable resin and catalyst toward cradle 12 while simultaneously chopping particles of fiber glass material into the stream of the spray. The angular approaches of the sheath 34 toward tank 14 permit cushion 22 to absorb shocks and bumps encountered by unit 10 if the latter is mounted on a mobile support for either transporting materials on roads and highways or for field use. It will be appreciated in this regard that, because the cushion 22 supports the entire lower half of tank 14, compression of cushion 22 in essentially all directions is permitted to accommodate the application of forces to tank 14 in such directions, while the latter is firmly held in place within cradle 12.

Having thus described the invention, what is claimed as new and desired to be secured by Letters Patent is:

1. In combination with a structure to be supported, a cradle comprising:
    an elongated, continuous, rigid frame looped beneath said structure, spaced from the latter throughout the length of the frame, and provided with a bight portion underlying the structure thereacross together with a pair of horizontally spaced, upright leg portions integral with the bight portion and embracing the structure between the legs,
    said frame being transversely channel shaped, presenting a trough throughout the lengths of said portions and opening inwardly toward said structure; and
    a connector interposed between said frame and said structure,
    said connector filling the trough and the space between the frame and the structure, and being integrally bonded tightly to said structure and to said frame throughout the length of the latter within the trough thereof in conformity with the shape and surface irregularities of the structure and of the frame,
    said connector being compressible, presenting a cushion for said structure.

2. The invention of Claim 1, wherein said cushion is generally trapezoidal in transverse cross section.

3. The invention of Claim 1, wherein said cradle is provided with means connected with the frame for mounting the cradle on a support.

4. The invention of claim 1; and a protective sheath enclosing the cradle and bonded to said structure.

5. The invention of claim 1; and a pair of opposed, L-shaped elements connected with the bight portion and with proximal leg portions for mounting the cradle on a support.

6. The invention of claim 1, wherein said cushion extends laterally from the trough in opposite directions toward said structure.

7. The invention of claim 1 wherein each leg portion includes an inclined portion extending downwardly and inwardly to the bight portion.

8. In combination with a structure to be supported, a cradle comprising:
    a frame looped beneath said structure;
    a cushion interposed between said frame and said structure and bonded to the frame and to the structure;
    said frame being generally U-shaped presenting a bight underlying said structure and a pair of opposed legs extending upwardly from the bight and having said structure disposed therebetween; and
    a pair of opposed, L-shaped elements connected with the bight and with proximal legs for mounting the cradle on a support,
    said legs and said bight presenting a container filled with said cushion and having a bottom wall and a pair of spaced flanges extending laterally from said bottom wall toward the structure,
    said cushion extending outwardly from the container toward said structure and laterally from the container in opposite directions toward said structure.

* * * * *